United States Patent
Ochiai

(10) Patent No.: US 7,564,991 B2
(45) Date of Patent: Jul. 21, 2009

(54) DEVICE, DEVICE CONTROL METHOD, AND PROGRAM

(75) Inventor: Masato Ochiai, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 773 days.

(21) Appl. No.: 11/235,421

(22) Filed: Sep. 26, 2005

(65) Prior Publication Data

US 2006/0067560 A1    Mar. 30, 2006

(30) Foreign Application Priority Data

Sep. 30, 2004  (JP)  ............................. 2004-288171

(51) Int. Cl.
*G06K 9/00* (2006.01)
*G06K 9/36* (2006.01)
*H04L 9/00* (2006.01)
*H04L 9/08* (2006.01)

(52) U.S. Cl. .................. 382/100; 382/232; 380/277; 380/282

(58) Field of Classification Search .............. 382/276, 382/100, 305, 307, 232, 306; 386/46, 94, 386/95, 52; 380/282, 277; 711/156, 164; 713/176
See application file for complete search history.

(56) References Cited

U.S. PATENT DOCUMENTS

| 5,898,779 A | * | 4/1999 | Squilla et al. ............... 713/176 |
| 6,131,162 A | * | 10/2000 | Yoshiura et al. ............. 713/176 |
| 2001/0021251 A1 | | 9/2001 | Kasai | |

FOREIGN PATENT DOCUMENTS

JP        2001-184186 A        7/2001

* cited by examiner

*Primary Examiner*—Yon Couso
(74) *Attorney, Agent, or Firm*—Canon U.S.A. Inc., I.P. Division

(57) ABSTRACT

A device includes: a storage unit configured to store predetermined data; a converter configured to convert the predetermined data stored in the storage unit into data in a predetermined format; a first image processor configured to convert the data in the predetermined format into data in a printable format; a printer configured to print an image based on the data in the printable format; an image capturer configured to capture the image printed by the printer; a second image processor configured to analyze image data corresponding to the image captured by the image capturer; and a storage controller configured to control the storage unit to store the predetermined data included in the data in the predetermined format acquired through analysis by the second image processor.

9 Claims, 13 Drawing Sheets

FIG. 5A 501

PRIVATE KEY

1A34B4CDF88124AB9CEF8522AA8011984A34B4FD28454CD9CAF75A21A8051B8

FIG. 5B 502

| | |
|---|---|
| ROOT CA CERTIFICATE | |
| VERSION | V3 |
| SEARIAL NUMBER | 1234 |
| SIGNATURE ALGORITHM | md5RSA |
| ISSUER | CN=hogehoge,Ou=xxx |
| START OF VALIDITY PERIOD | 1999/1/1 |
| END OF VALIDITY PERIOD | 2018/12/31 |
| SUBJECT | CN=aaa,OU=yyy |
| PUBLICK KEY | RSA(1234 5678...) |

ELECTRONIC INFORMATION DATA --2004.6.1 –page1–

SERIAL NUMBER:1234X

DEVICE, DEVICE CONTROL METHOD, AND PROGRAM

BACKGROUND OF THE INVENTION

1. Field of the Invention

The present invention relates to devices, device control methods, programs, and storage media. In particular, the present invention relates to a device for manipulating data stored therein, a method for controlling the device, a program, and a storage medium.

2. Description of the Related Art

As encryption functions become more popular, an increasing number of devices including personal computers and digital copy machines are adopting encrypted-communication functions and encrypted-data holding functions (e.g., see Japanese Patent Laid-Open No. 2001-184186). In such a device, the device itself holds confidential information, such as a private key, a server certificate, and a root Certificate Authority (CA) certificate, in a hard disk drive (hereinafter, referred to as an "HDD"). Since the HDD is prone to damage, it is necessary to back up such confidential information. More specifically, a technique for backing up a private key in an external memory medium, such as a floppy disk, a memory card, or a universal serial bus (USB) memory, connected to the device has been proposed.

However, the above-described known technique requires a device for connecting the external memory medium in order to copy the private key onto the external memory medium. This adds to cost. Furthermore, since the private key is stored in the external memory medium as electronic data, there is a danger of an information leak.

SUMMARY OF THE INVENTION

The present invention provides a device, a device control method, a program, and a storage medium for backing up predetermined data, for example confidential information, stored in the device without using an external memory medium.

According to one aspect of the present invention, a device includes: a storage unit configured to store predetermined data; a converter configured to convert the predetermined data stored in the storage unit into data in a predetermined format; a first image processor configured to convert the data in the predetermined format into data in a printable format; a printer configured to print an image based on the data in the printable format; an image capturer configured to capture the image printed by the printer; a second image processor configured to analyze image data corresponding to the image captured by the image capturer; and a storage controller configured to control the storage unit to store the predetermined data included in the data in the predetermined format acquired through analysis by the second image processor.

According to another aspect of the present invention, a method for controlling a device including a storage unit storing predetermined data includes steps of: converting the predetermined data stored in the storage unit into data in a predetermined format; converting the data in the predetermined format into data in a printable format; printing an image based on the data in the printable format; capturing the image that was printed; analyzing image data corresponding to the image that was captured; and controlling the storage unit to store the predetermined data included in the data in the predetermined format acquired through analyzing the image data.

According to still another aspect of the present invention, a computer program causes a computer to execute the above-described method.

Further features of the present invention will become apparent from the following description of exemplary embodiments with reference to the attached drawings.

BRIEF DESCRIPTION OF THE DRAWINGS

FIGS. 5A and 5B illustrate a private key and a root CA certificate stored in the HDD shown in FIG. 2.

DESCRIPTION OF THE EMBODIMENTS

Embodiments according to the present invention will now be described in detail with reference to the drawings.

Figure 1:
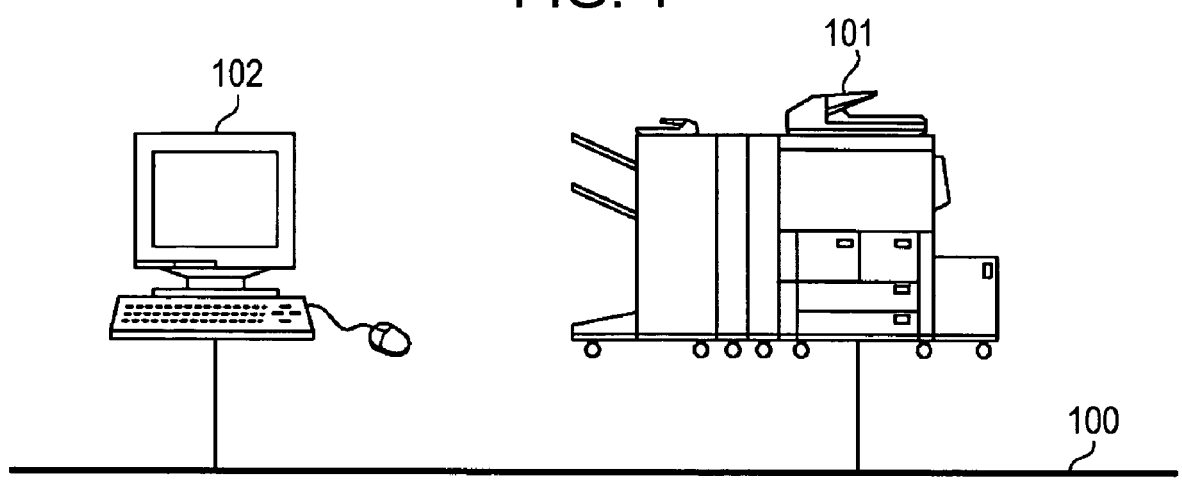
FIG. 1 is a diagram illustrating an exemplary structure of a system having a network device according to an embodiment of the present invention.

FIG. 1 is a diagram illustrating an exemplary structure of a system having a network device according to an embodiment of the present invention.

Referring to FIG. 1, the system includes a network device 101, a personal computer (hereinafter, referred to as a "PC") 102, and a local area network (LAN) 100 for interconnecting the network device 101 and the PC 102. The network device 101 provides a network print service and a scan service.

Figure 2:
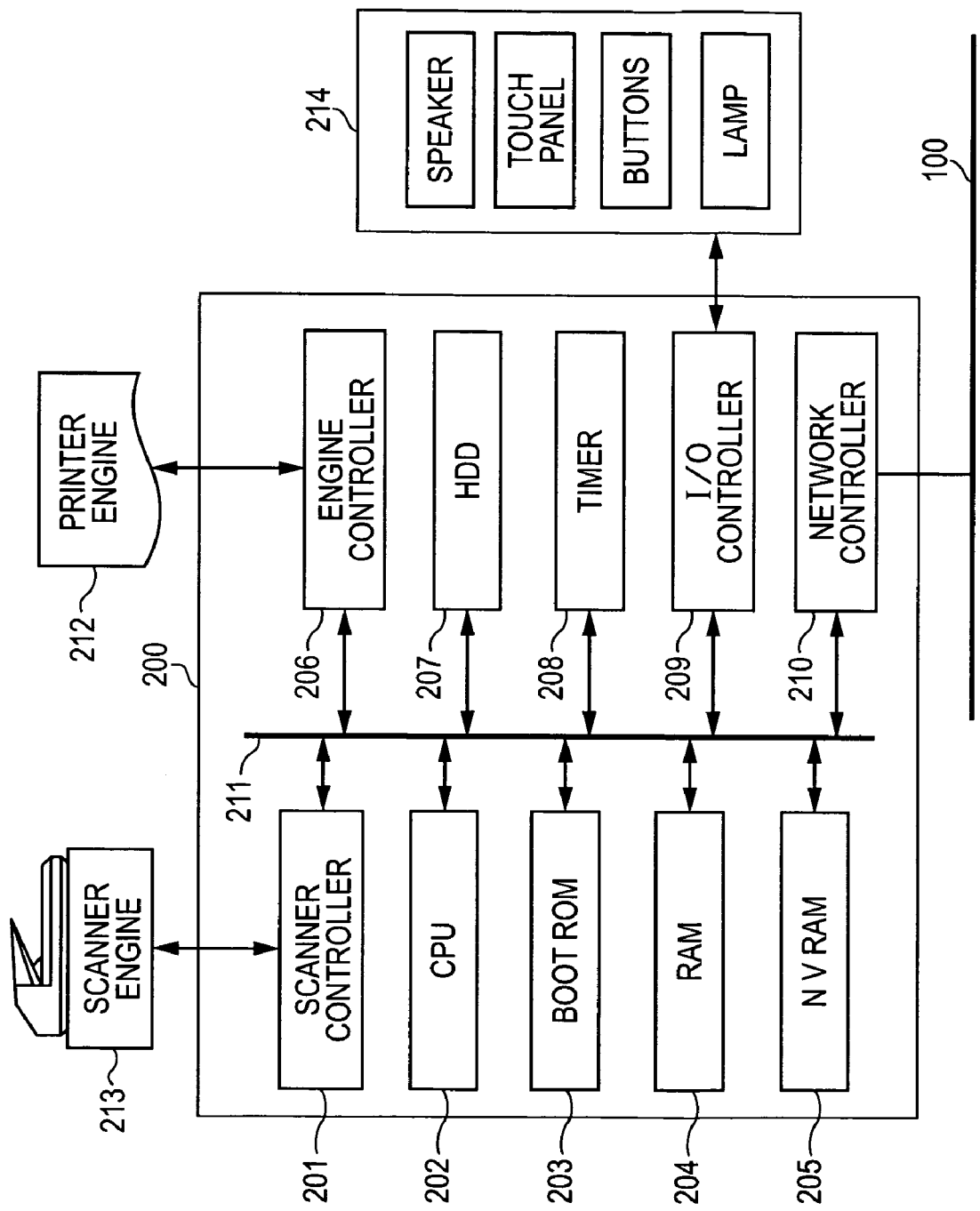
FIG. 2 is a block diagram illustrating an exemplary structure of the network device shown in FIG. 1.

FIG. 2 is a block diagram illustrating an exemplary structure of the network device 101 shown in FIG. 1.

Referring to FIG. 2, the network device 101 includes a scanner engine 213, a printer engine 212, user interfaces 214 (FIG. 3), such as a touch panel, buttons, a speaker and a lamp, and a control section 200 for controlling the scanner engine 213, the printer engine 212, and the user interfaces 214.

The control section 200 includes a scanner controller 201, a CPU 202, a boot read-only memory (ROM) 203, a random access memory (RAM) 204, a non-volatile RAM (NVRAM) 205, an engine controller 206, a hard disk drive (HDD) 207, a timer 208, an input/output (I/O) controller 209, a network controller 210, and a bus, such as a universal serial bus (USB) 211.

The scanner controller 201 controls the scanner engine 213 functioning as a scanner device. The boot ROM 203 stores a boot program carried out by the CPU 202. The RAM 204 is used as a work memory for the CPU 202. The NVRAM 205 holds values set on the panel. A product-specific ID, such as the product serial number or Media Access Control (MAC) address on the network, is stored in the NVRAM 205.

The engine controller 206 controls the printer engine 212. The I/O controller 209 controls the user interface 214 including, e.g., the panel, the buttons, the speaker, the lamp, some combination thereof, etc. The network controller 210 is connected to the LAN 100.

The CPU 202 controls the above-described components according to the boot program. Furthermore, the CPU 202 and the above-described components are connected to the bus 211 to communicate with each other via the bus 211.

The HDD 207 stores the program modules shown in FIG. 4 (described below) for controlling the network device 101 and a private key 501 and a root CA certificate 502 shown in FIGS. 5A and 5B, respectively.

Figure 3:
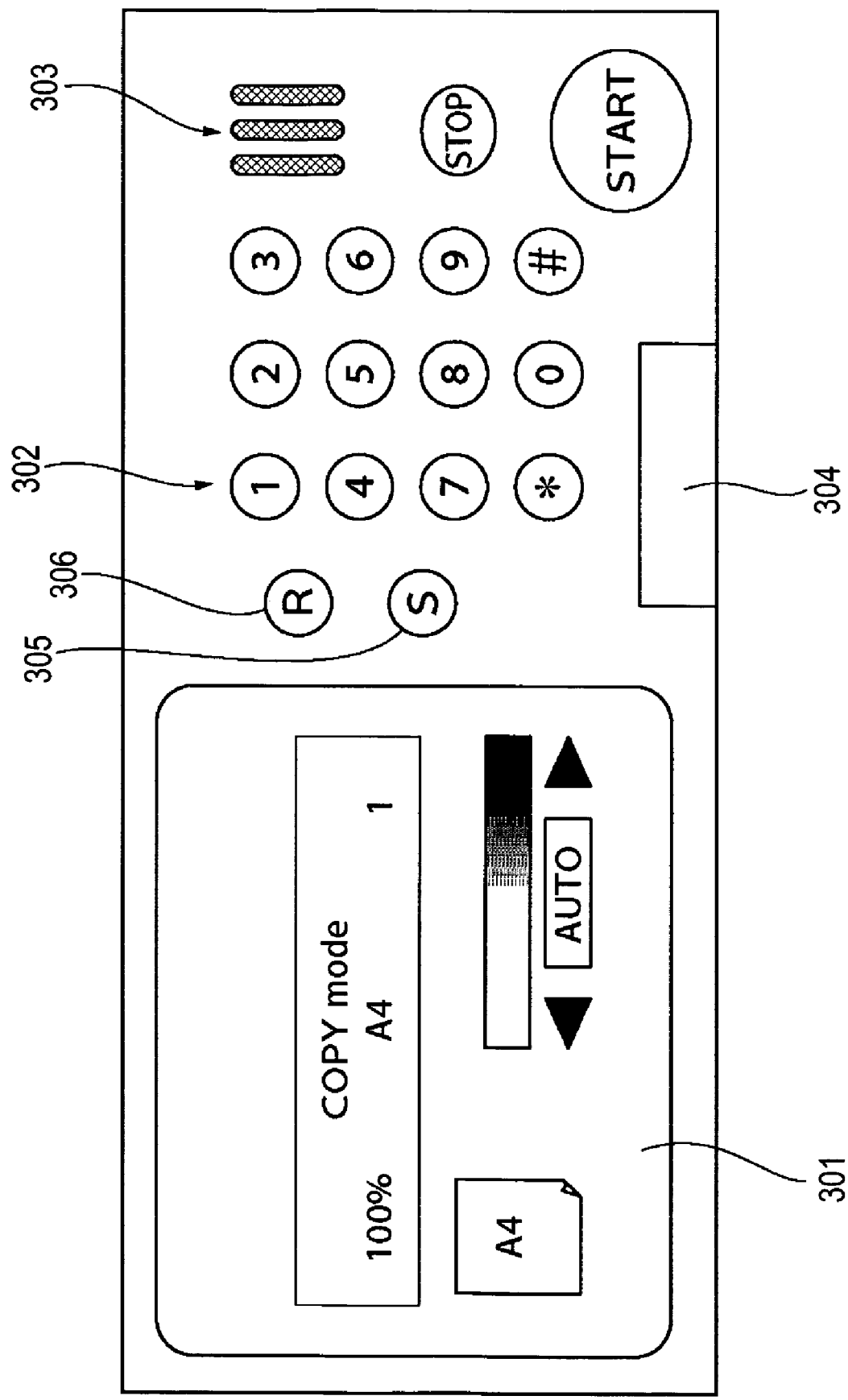
FIG. 3 is a diagram illustrating the user interface shown in FIG. 2.

FIG. 3 is a diagram illustrating the user interface 214 shown in FIG. 2.

Referring to FIG. 3, the user interface 214 includes on the operating face thereof a touch panel 301, numeric keypad buttons 302, a speaker 303, a lamp 304, a service button S 305, and a set button R 306.

A user performs various types of setting by operating the touch panel 301. The touch panel 301 in FIG. 3 shows a stand-by screen for copying. The numeric keypad buttons 302 are used to enter numbers from 0 to 9. When the service button S 305 is pressed, various service screens appear on the touch panel 301 to allow the user to receive services other than copying. When the user presses the set button R 306, various setting screens appear on the touch panel 301 to allow the user to set parameters. The speaker 303 outputs a sound, a buzzer, and other audio information. The lamp 304 blinks if a jam occurs during printing or copying.

Figure 4:
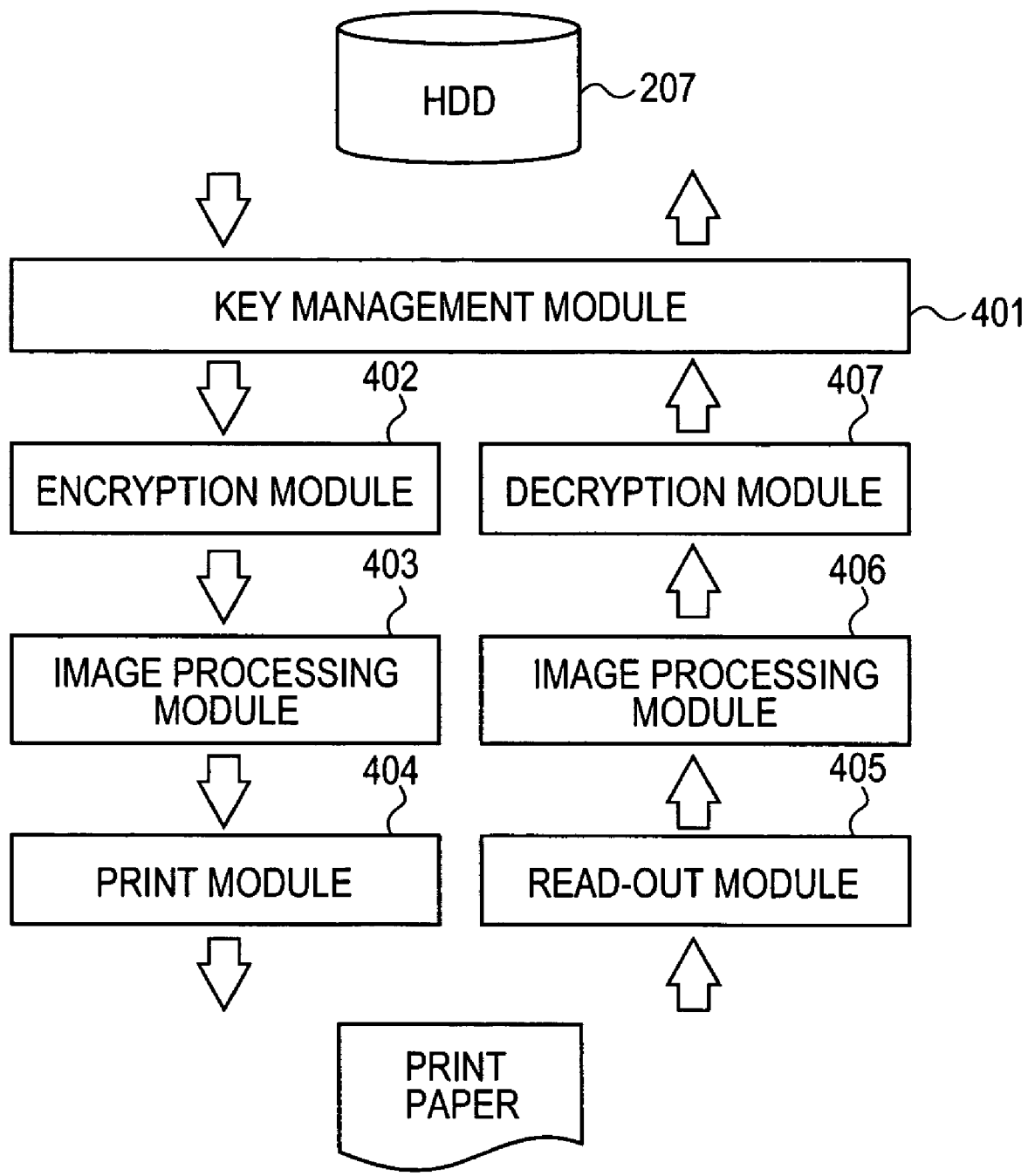
FIG. 4 is a block diagram illustrating an exemplary structure of device control program modules stored in the HDD shown in FIG. 2.

FIG. 4 is a block diagram depicting the structure of the device control program modules stored in the HDD 207 shown in FIG. 2.

Referring to FIG. 4, the HDD 207 shown in FIG. 2 stores a key management module 401, an encryption module 402, an image processing module 403, a print module 404, a read-out module 405, an image processing module 406, and a decryption module 407.

The key management module 401 manages key information, server certificate information, and root CA certificate information required to perform encrypted communication. The encryption module 402 performs encryption processing of data with a key given by the key management module 401. The image processing modules 403 and 406 perform predetermined image processing. The print module 404 controls the engine controller 206 to cause the image printer engine 212 to output images. The read-out module 405 controls the scanner controller 201 to cause the scanner engine 213 to capture images and read out image data corresponding to the captured image. The decryption module 407 performs decryption processing of data with a key given by the key management module 401.

When the power is turned ON, the CPU 202 reads the boot program from the boot ROM 203 to boot up the network device 100 under the control of the boot program. Furthermore, the CPU 202 loads the device control program modules from the HDD 207 into the RAM 204 according to the boot program. The CPU 202 then executes the device control program modules, shown in FIG. 4, loaded into the RAM 204 to control the network device 100.

More specifically, when the CPU 202 is to back up information about the private key (see example in FIG. 5A) and the root CA certificate (see example in FIG. 5B) stored in the HDD 207, the CPU carries out the key information backup processing in FIG. 6 (described below). The CPU 202 causes the encryption module 402 to use any key to encrypt the key information and server certificate information managed in the HDD 207 by the key management module 401. Data encrypted by the encryption module 402 is converted into printable image data by the image processing module 403. After the image conversion, the print module 404 causes the printer engine 212 to form an image on a paper surface based on the printable image data.

On the other hand, when the CPU 202 is to take out a key from the image on the paper surface, it carries out the key information decryption processing shown in FIG. 13 (described below). The read-out module 405 causes the image processing module 406 to convert image data read out by the scanner engine 213 into binary data. Thereafter, the decryption module 407 decrypts the binary data, and then the key management module 401 acquires key information or server certificate information from the decrypted data and stores the key information or the server certificate information again in the HDD 207.

Although in this embodiment the encryption module 402, the image processing modules 403 and 406, and the decryption module 407 are realized in the form of software programs, these modules can also be realized in the form of hardware devices while maintaining the same advantages.

Figure 6:
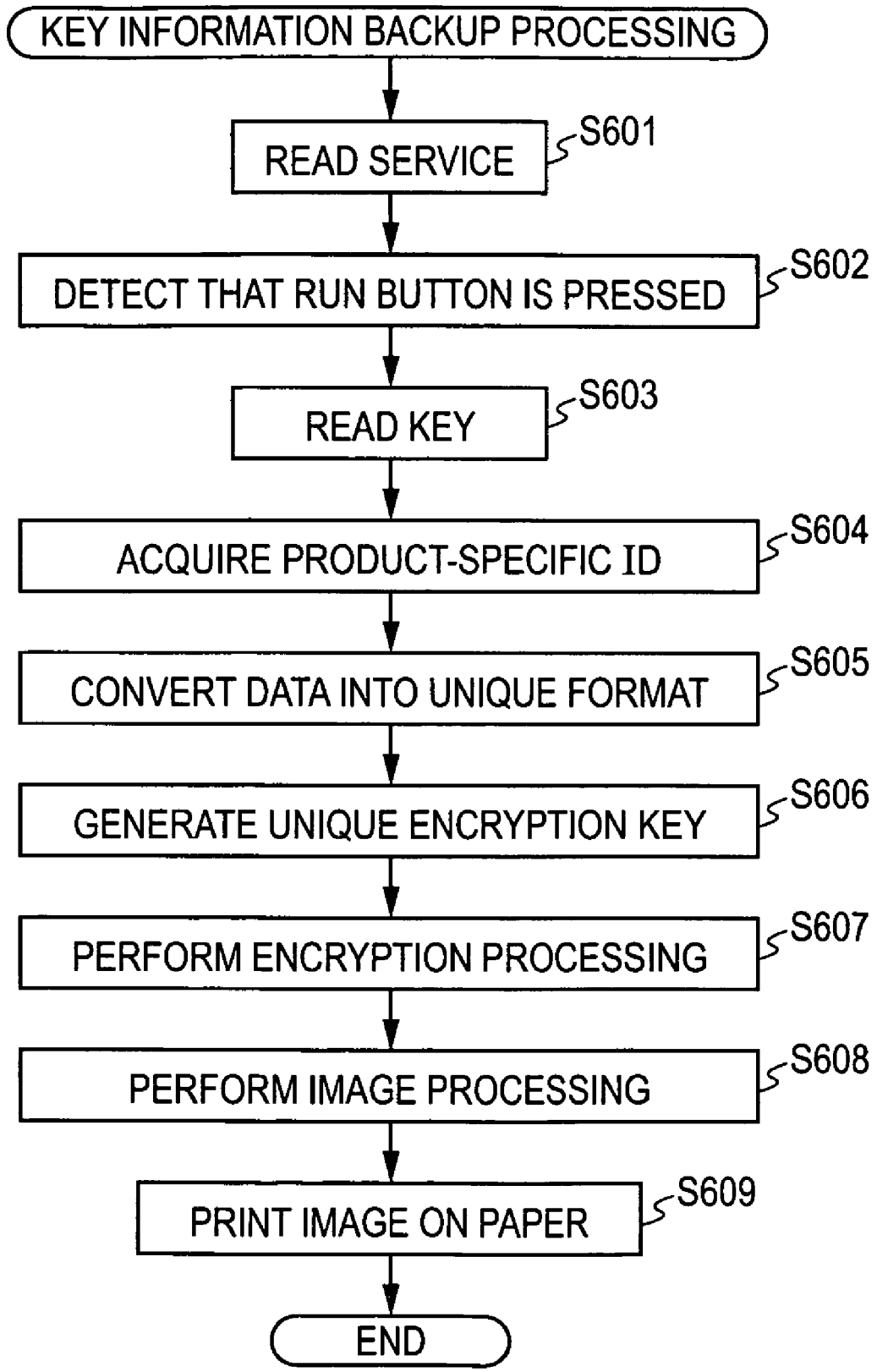
FIG. 6 is a flowchart illustrating a procedure for key information backup processing carried out by the central processing unit (CPU) shown in FIG. 2.

FIG. 6 is a flowchart illustrating a procedure for key information backup processing carried out by the CPU 202 shown in FIG. 2.

Figure 7:
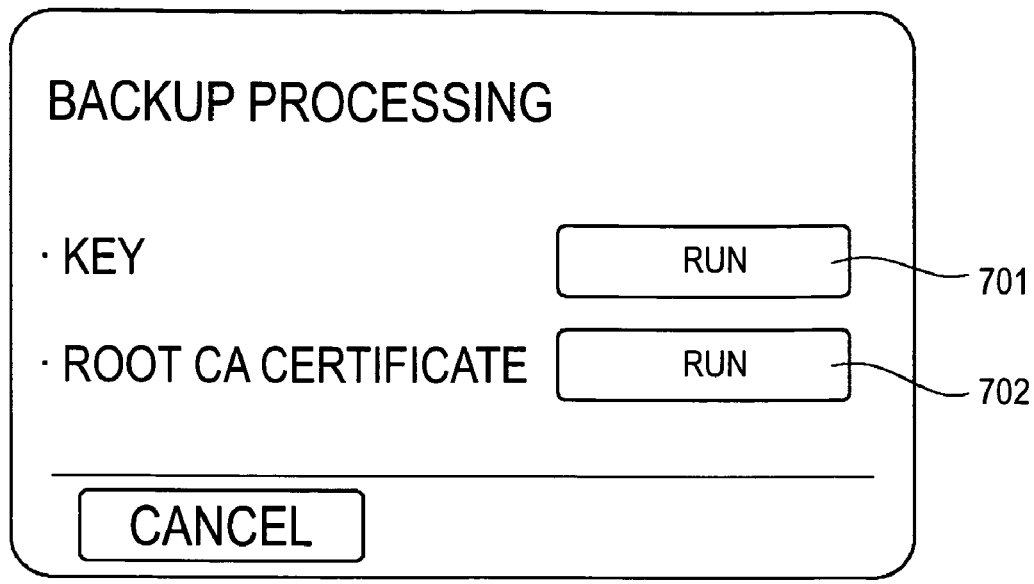
FIG. 7 is a diagram illustrating a "key" service and a "root CA certificate" service.

Referring to FIG. 6, when the service button "S" 305 on the user interface 214 is pressed, the CPU 202 displays on the touch panel 301 a "key" service and a "root CA certificate" service from among several services (step S601). FIG. 7 shows an example where the "key" service and the "root CA certificate" service are displayed on the touch panel 301. When the operator wants to back up key information, he or she presses a RUN button 701 next to a "key" label. When the operator is to back up root CA certificate information, he or she presses a RUN button 702 next to a "root CA certificate" label. The CPU 202 detects that the (key) RUN button 701 or the (root CA certificate) RUN button 702 is pressed (step S602). Then, the key management module 401 is executed by the CPU 202.

This embodiment assumes that key information is to be backed up by pressing the RUN button 701. The processing described below is applied when root CA certificate information is to be backed up as well.

The key management module 401 reads the private key information 501 (FIG. 5A) from the HDD 207 (step S603). Furthermore, the key management module 401 acquires a product-specific ID, such as the serial number or the MAC address of the product (step S604).

Figure 8:
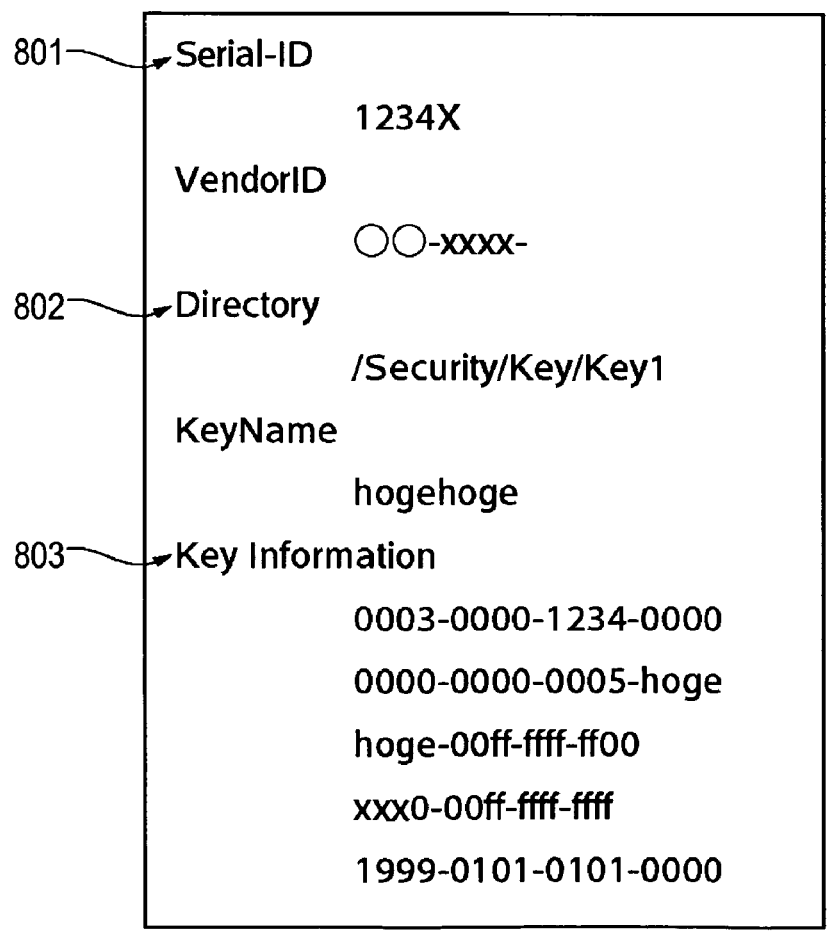
FIG. 8 is a diagram illustrating data in a unique format generated through conversion.

Next, the key management module 401 generates data in a unique format. FIG. 8 is a diagram illustrating the data in a unique format generated by the key management module 401. As shown in FIG. 8, the data generated in a unique format includes a product-specific identification (ID) (Serial-ID) 801, a Directory 802, and Key Information 803 (step S605).

Figure 9:
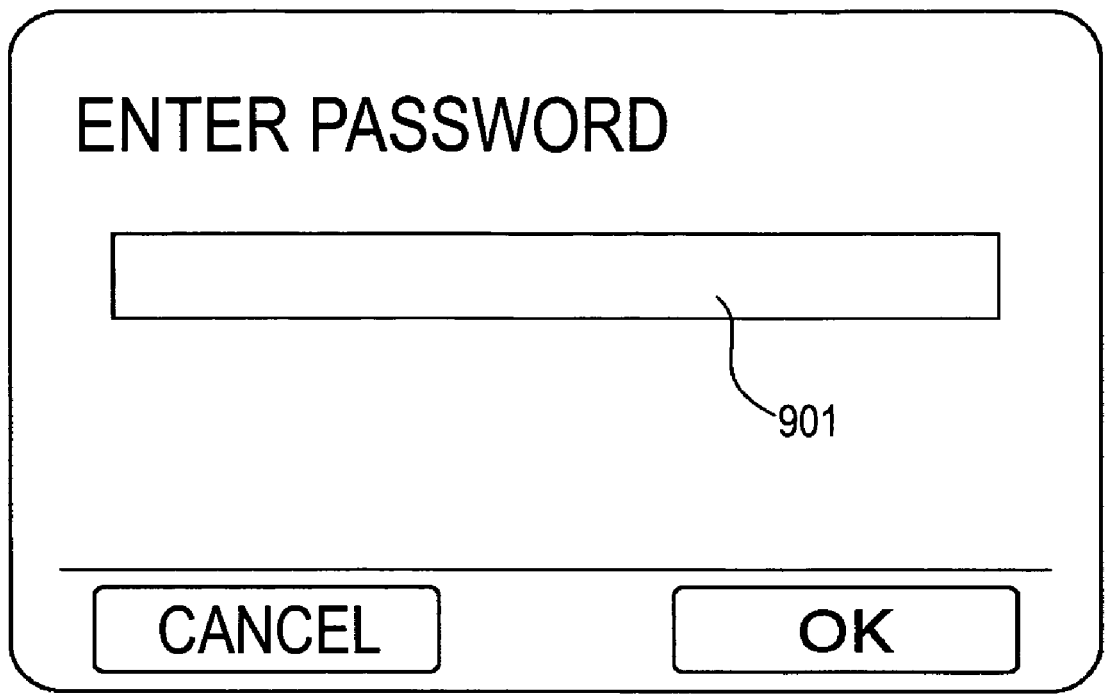
FIG. 9 is a diagram illustrating a password entry screen.

The key management module 401 displays a password entry screen on the touch panel 301 of the user interface 204 to prompt the user to enter a password in a predetermined password entry field 901. FIG. 9 shows an exemplary password entry screen.

Figure 10:
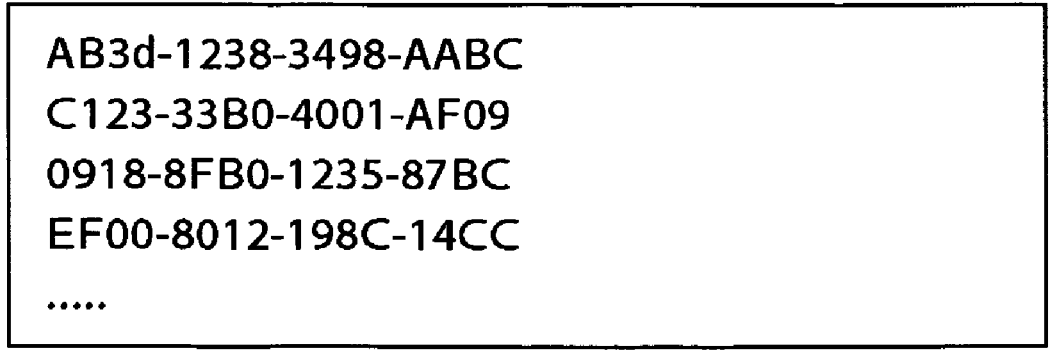
FIG. 10 is a diagram illustrating encrypted data generated.

The key management module 401 generates an encryption key, based on the entered password and the product-specific ID, for encrypting the data in the unique format (step S606). The encryption module 402 encrypts the data (FIG. 8) in the unique format using the encryption key generated in step S606 and thus generates encrypted data (step S607). FIG. 10 illustrates the encrypted data. The encryption module 402 then sends the encrypted data (FIG. 10) to the image processing module 403 (step S607).

In response, the image processing module 403 performs image processing to convert the encrypted data (FIG. 10) received from the encryption module 402 into image data in a printable format, and sends the image data generated through the image processing to the print module 404 (step S608). Printable formats include a two-dimensional barcode format and a standard barcode format.

The print module 404 controls the printer engine 212 via the engine controller 206 to print on a paper surface an image based on the image data (step S609). This completes the current processing.

Figure 11:
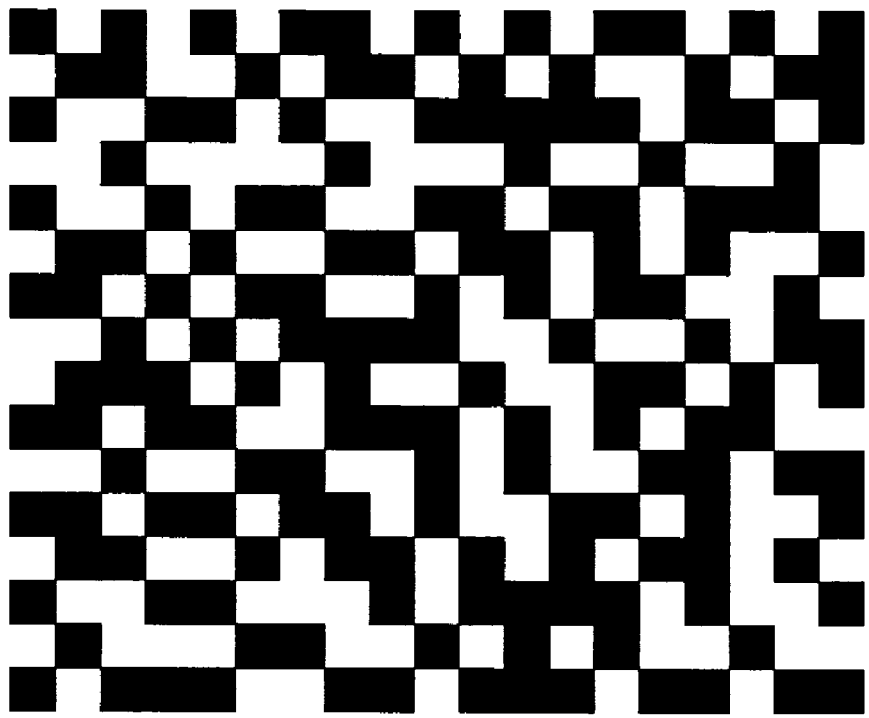
FIG. 11 is a diagram illustrating a print result when image processing is performed in a two-dimensional barcode format shown in FIG. 6.
Figure 12:
FIG. 12 is a diagram illustrating a print result when image processing is performed in a barcode format.
Figure 12:
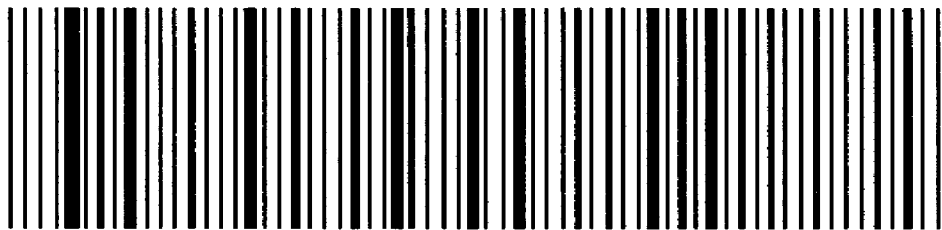

In the image processing of step S609, if image data in a two-dimensional barcode format is generated, an image as shown in FIG. 11 is printed. On the other hand, if image data in a barcode format is generated in the image processing of step S609, an image as shown in FIG. 12 is printed.

Figure 13:
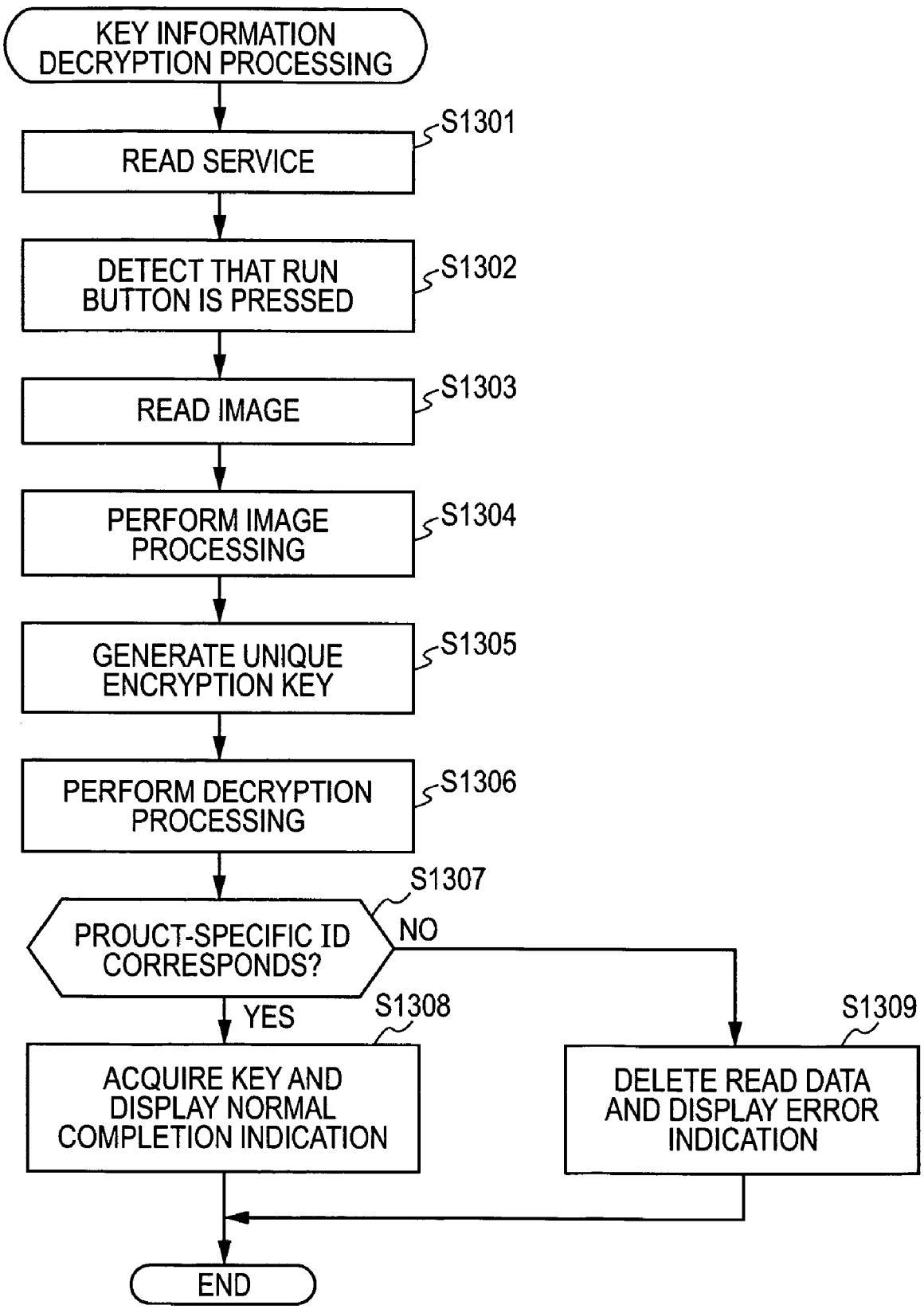
FIG. 13 is a flowchart illustrating a procedure for key information decryption processing carried out by the CPU shown in FIG. 2.

FIG. 13 is a flowchart illustrating a procedure for key information decryption processing carried out by the CPU 202 shown in FIG. 2.

Figure 14:
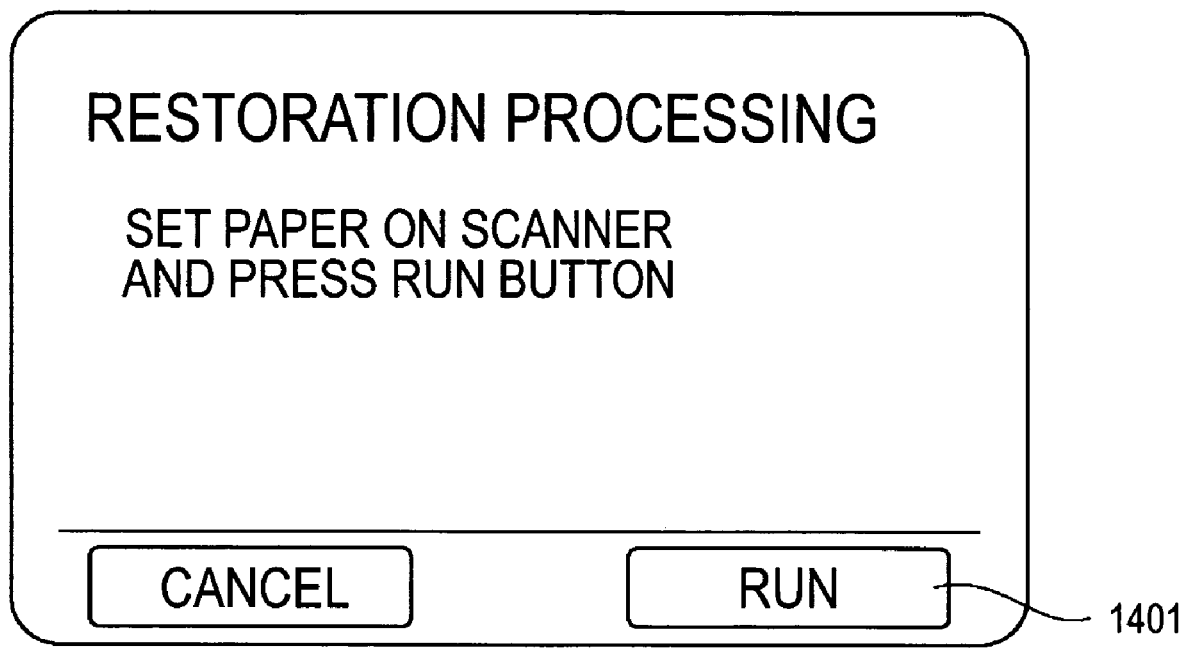
FIG. 14 is a diagram illustrating a restoration screen.

Referring to FIG. 13, when the service button "S" 305 on the user interface 204 is pressed, the CPU 202 displays a restoration screen on the touch panel 301 (step S1301). FIG. 14 shows the restoration screen. The user sets on the scanner the paper surface having the key information backed up (i.e., the paper surface on which the image shown in FIG. 11 or FIG. 12 is printed) and presses a RUN button 1401. The CPU 202 detects that the RUN button 1401 is pressed (step S1302). The read-out module 405 is then executed by the CPU 202.

The read-out module 405 controls the scanner engine 213 via the scanner controller 201 and causes the scanner engine 213 to capture an image and read the image data (two-dimensional barcode or barcode information) from the paper set on the scanner (step S1303). Then, the read-out module 405 sends the image data read out by the scanner engine 213 to the image processing module 406.

The image processing module 406 analyzes the image data according to rules for the two-dimensional barcode or the barcode, converts the image data into binary data, and generates data which is encrypted using a predetermined encryption key (step S1304).

Next, the key management module 401 displays the password entry screen on the touch panel 301 of the user interface 204, and prompts the user to enter a password in the predetermined password entry field 901 (FIG. 9). The key management module 401 generates an encryption key, based on this password and the product-specific ID, for decrypting the data generated in step S1304 (step S1305).

The decryption module 407 uses the encryption key generated in step S1305 to decrypt the data generated in step S1304 and generates data (corresponding to FIG. 8) in a unique format (step S1306).

Figure 15A:
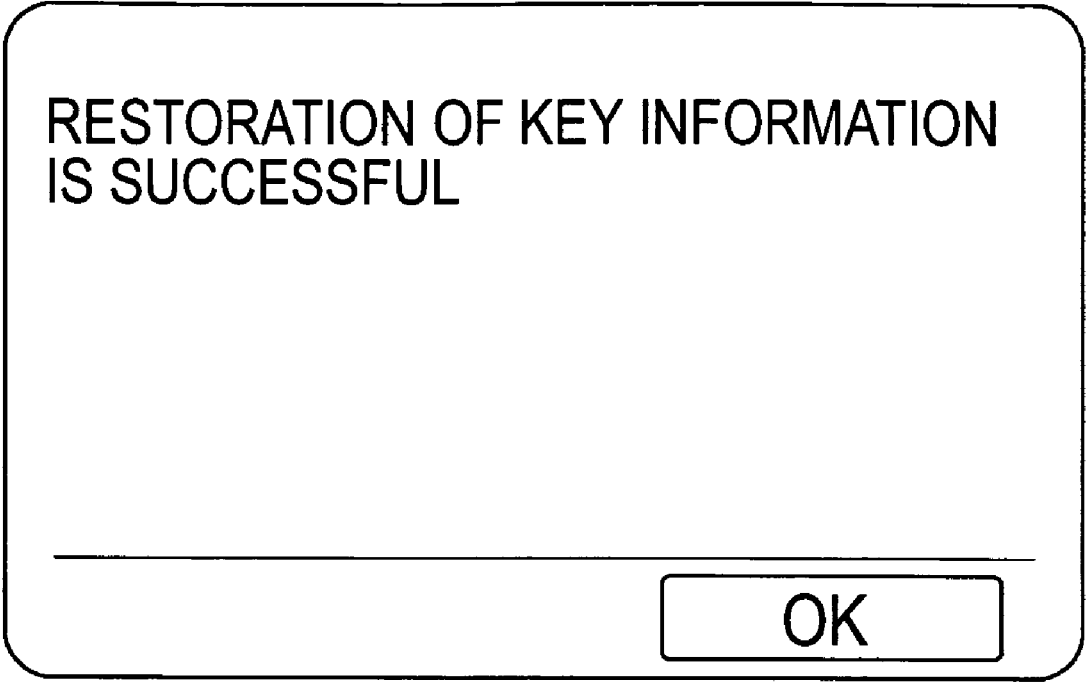
FIG. 15A is a "normal completion" indication display.
Figure 15B:
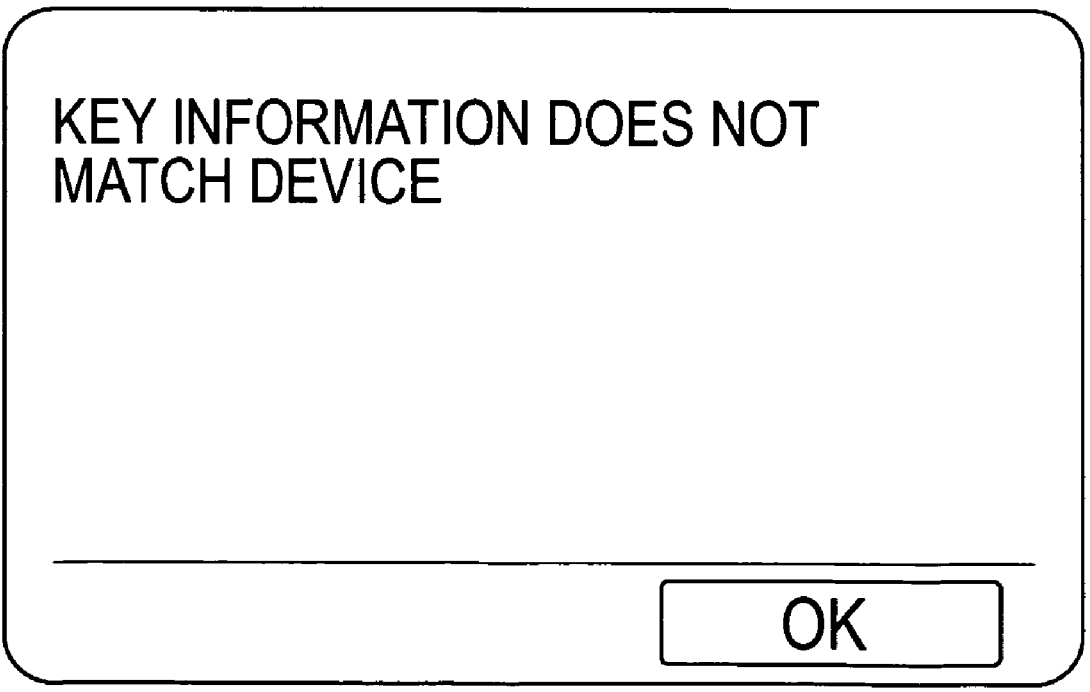
FIG. 15B is a diagram illustrating an "error" indication display.

Next in step S1307, the key management module 401 determines whether or not the product-specific ID (corresponding to 801 in FIG. 8) included in the data in the unique format, which has been generated in step S1306, corresponds to the product-specific ID stored in the NVRAM 205. If a correspondence is achieved, the key management module 401 reads out the key information (corresponding to 803 in FIG. 8) from the data in the unique format and saves it in the directory (corresponding to 802 in FIG. 8) specified by the data in the unique format. The key management module 401 then displays a "normal completion" indication on the touch panel 301 (step S1308). FIG. 15A shows an exemplary "normal completion" indication display. If a correspondence is not achieved, the key management module 401 deletes the read-out data and displays an "error" indication on the touch panel 301 (step S1309). FIG. 15B shows an exemplary "error" indication display. Processing of FIG. 13 ends after acquiring the key and displaying a "normal completion" indication (step S1308) or deleting read data and displaying an "error" indication (step S1309).

Furthermore, the system or the device is provided with a storage medium (or recording medium) storing software program code for performing the functions of the foregoing embodiment. Thus, the present invention may also be achieved by a computer (i.e., CPU or micro-processing unit (MPU)) in the system or the device reading the software program code and then executing the program code.

In this case, the program code read from the storage medium performs the functions of the foregoing embodiment.

As described above, the functions of the foregoing embodiment are realized by executing the program code read by the computer. In addition, the functions of the foregoing embodiment may also be achieved by, for example, the operating system (OS) running on the computer that performs all or part of the processing according to the commands of the program code.

In this case, any form of program is acceptable, as long as it can cause the computer to achieve the functions of the foregoing embodiment. The program code may be realized as a program executed as object code or by an interpreter and script data supplied to the OS.

The storage medium for supplying the program code includes a RAM, a NVRAM, a floppy disk, an optical disk, a magneto-optical disk, a compact disk-ROM (CD-ROM), a magneto optical (MO), a CD-recordable (CD-R), a CD-rewritable (CD-RW), a digital versatile disk (DVD), (e.g., a DVD-ROM, DVD-RAM, DVD–RW, and DVD+RW), a magnetic tape, a non-volatile memory card, and other types of ROMs that can store the above-described program code. Alternatively, the above-described program may be downloaded from a computer or database (not shown) connected to the Internet, a commercial network, or a local area network.

According to the present invention, data such as confidential information stored in the device can be backed up without using an external memory medium.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2004-288171 filed Sep. 30, 2004, which is hereby incorporated by reference herein in its entirety.

What is claimed is:

1. A device comprising:
   a storage unit configured to store predetermined data;
   a converter configured to convert the predetermined data stored in the storage unit into data in a predetermined format;

a first image processor configured to convert the data in the predetermined format into data in a printable format;
a printer configured to print an image based on the data in the printable format;
an image capturer configured to capture the image printed by the printer;
a second image processor configured to analyze image data corresponding to the image captured by the image capturer; and
a storage controller configured to control the storage unit to store the predetermined data included in the data in the predetermined format acquired through analysis by the second image processor;
an encrypter configured to encrypt the data in the predetermined format; and
a decrypter configured to decrypt the data encrypted by the encrypter, wherein
the first image processor is configured to convert the data encrypted by the encrypter into data in the printable format,
the second image processor is configured to acquire the data encrypted by the encrypter through analysis of the image data corresponding to the image captured by the image capturer,
the decrypter is configured to decrypt the data encrypted by the encrypter and acquired by the second image processor, and
the storage controller is configured to control the storage unit to store the predetermined data included in the data decrypted by the decrypter in the predetermined format.

2. The device according to claim 1, wherein the data in the predetermined format includes a product-specific identification.

3. The device according to claim 2, wherein a key for encryption by the encrypter is generated based on the product-specific identification.

4. The device according to claim 1, wherein a key for encryption by the encrypter is generated based on data entered by a user.

5. The device according to claim 1, wherein the data in the predetermined format includes confidential information.

6. The device according to claim 1, wherein the first image processor is configured to perform barcode conversion and the second image processor is configured to analyze the image data according to a barcode rule.

7. The device according to claim 1, further comprising:
a memory configured to store specific information unique to the device; and
a comparator configured to compare information included in the data in the predetermined format acquired through analysis by the second image processor with the specific information stored in the memory, wherein
the storage controller is configured to control the storage unit to store the predetermined data included in the data in the predetermined format acquired through analysis by the second image processor if the information included in the data in the predetermined format acquired through the analysis by the second image processor corresponds to the specific information stored in the memory.

8. A method for controlling a device including a storage unit, the method comprising steps of:
a storing step of storing predetermined data in the storage unit of the device;
a converting step, performed by a converter, of converting the predetermined data stored in the storage unit of the device into data in a predetermined format;
a first image processing step, performed by a first image processor, of converting the data in the predetermined format into data in a printable format;
a printing step of printing an image based on the data in the printable format;
an image capturing step, performed by an image capturer, of capturing the image that was printed;
a second image processing step, performed by a second image processor of analyzing image data corresponding to the image that was captured;
a storing step, performed by a storage controller, of controlling the storage unit of the device to store the predetermined data included in the data in the predetermined format acquired through analyzing the image data,
an encrypting step, performed by an encrypter, of encrypting the data in the predetermined format; and
a decrypting step, performed by a decrypter, of decrypting the data encrypted in the encrypting step, wherein
the first image processing step comprises converting the data encrypted in the encrypting step into data in the printable format,
the second image processing step comprises acquiring the data encrypted in the encrypting step through analysis of the image data corresponding to the image captured in the image capturing step,
the decrypting step comprises decrypting the data encrypted in the encrypting step and acquired in the second image processing step, and
the storing step comprises controlling the storage unit to store the predetermined data included in the data decrypted in the decrypting step in the predetermined format.

9. A computer-readable medium having stored thereon a computer program causing a computer to execute steps of:
a storing step of storing predetermined data in a storage unit;
a converting step of converting the predetermined data stored in the storage unit into data in a predetermined format;
a first image processing step of converting the data in the predetermined format into data in a printable format;
a second image processing step of analyzing image data which is input by capturing an image printed based on the data in the printable format;
a storing step of controlling the storage unit to store the predetermined data included in the data in the predetermined format acquired through analyzing the image data;
an encrypting step of encrypting the data in the predetermined format; and
a decrypting step of decrypting the data encrypted in the encrypting step, wherein
the first image processing step comprises converting the data encrypted in the encrypting step into data in the printable format,
the second image processing step comprises acquiring the data encrypted in the encrypting step through analysis of the image data corresponding to the captured image,
the decrypting step comprises decrypting the data encrypted in the encrypting step and acquired in the second image processing step, and
the storing step comprises controlling the storage unit to store the predetermined data included in the data decrypted in the decrypting step in the predetermined format.

* * * * *